United States Patent
Dietrich et al.

(10) Patent No.: US 11,726,865 B2
(45) Date of Patent: *Aug. 15, 2023

(54) BIT AND SIGNAL LEVEL MAPPING

(71) Applicant: Micron Technology, Inc., Boise, ID (US)

(72) Inventors: Stefan Dietrich, Türkenfeld (DE); Martin Brox, Munich (DE); Michael Dieter Richter, Ottobrunn (DE); Thomas Hein, Munich (DE); Ronny Schneider, Höhenkirchen-Siegertsbrunn (DE); Natalija Jovanovic, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,418

(22) Filed: Apr. 21, 2022

(65) Prior Publication Data

US 2022/0245026 A1    Aug. 4, 2022

Related U.S. Application Data

(63) Continuation of application No. 17/150,480, filed on Jan. 15, 2021, now Pat. No. 11,327,832.

(Continued)

(51) Int. Cl.
*G06F 11/10*    (2006.01)

(52) U.S. Cl.
CPC .................. *G06F 11/1004* (2013.01)

(58) Field of Classification Search
None
See application file for complete search history.

(56) References Cited

U.S. PATENT DOCUMENTS 9,590,765 B2 * 3/2017 Pi ................... H04L 1/1819
10,261,705 B2 * 4/2019 Li ..................... G06F 11/1004
(Continued)

OTHER PUBLICATIONS

L. Tang, J. A. Ambrose, S. Parameswaran and S. Zhu, "Reconfigurable Convolutional Codec for Physical Layer Communication Security Application," 2014 IEEE Military Communications Conference, Baltimore, MD, USA, 2014, pp. 82-87, doi: 10.1109/MILCOM.2014.21. (Year: 2014).*

(Continued)

*Primary Examiner* — Daniel F. McMahon
(74) *Attorney, Agent, or Firm* — Holland & Hart LLP

(57) ABSTRACT

Methods, systems, and devices for bit and signal level mapping are described to enable a memory device to transmit or receive a multi-symbol signal that includes more than two (2) physical levels. Some cyclic redundancy check (CRC) calculations generate one or more bits of CRC output per symbol of an associated signal and the output are transmitted via a multi-symbol signal by converting one or more CRC output bit to a physical level of the signal. The conversion, or mapping, process is performed such that the physical levels of the signal avoid a transition between a highest physical level and lowest physical level. For example, a modulation scheme or mapping process is configured to map different values of CRC output bits to different physical levels, where the different physical levels are separated by one other physical level associated with the signal or the modulation scheme.

20 Claims, 7 Drawing Sheets

Related U.S. Application Data

(60) Provisional application No. 62/964,503, filed on Jan. 22, 2020.

(56) References Cited

U.S. PATENT DOCUMENTS

| | | | | |
|---|---|---|---|---|
| 10,651,979 | B1* | 5/2020 | Katakwar | H03K 19/0005 |
| 2009/0010318 | A1* | 1/2009 | Belogolovyi | H04L 25/4917 |
| | | | | 375/222 |
| 2013/0173999 | A1* | 7/2013 | Park | H04L 27/3488 |
| | | | | 714/E11.032 |
| 2018/0102168 | A1* | 4/2018 | Naiss | G11C 11/5642 |
| 2019/0279694 | A1* | 9/2019 | Penney | G11C 11/4072 |
| 2019/0340068 | A1* | 11/2019 | Bhatia | H03M 13/2906 |
| 2019/0341914 | A1* | 11/2019 | Su | H04L 25/03006 |
| 2020/0356439 | A1* | 11/2020 | Linstadt | G06F 11/1076 |

OTHER PUBLICATIONS

International Search Report and Written Opinion received for PCT Patent Application No. PCT/US21/13976, dated Apr. 22, 2021, 9 pages.

Lajos Hanzo; Jonathan Blogh; Song Ni, "High Speed Downlink and Uplink Packet Access," in 3G, HSPA and FDD versus TDD Networking: Smart Antennas and Adaptive Modulation , IEEE, 2008, pp. 87-117, doi: 10.1002/9780470754290.ch2. (Year: 2008).

Y. Chang, W. Lu, P. Huang, L. Lee and T. Kuo, "An Efficient FTL Design for Multi-chipped Solid-State Drives," 2010 IEEE 16th International Conference on Embedded and Real-Time Computing Systems and Applications, 2010, pp. 237-246, doi: 10.1109/RTCSA. 2010.37. (Year: 2010).

* cited by examiner

BIT AND SIGNAL LEVEL MAPPING

CROSS REFERENCE

The present application for patent is a continuation of U.S. patent application Ser. No. 17/150,480 by DIETRICH et al., entitled "BIT AND SIGNAL LEVEL MAPPING," filed Jan. 15, 2021, which claims priority to U.S. Provisional Patent Application No. 62/964,503 by DIETRICH et al., entitled "BIT AND SIGNAL LEVEL MAPPING," filed Jan. 22, 2020, each of which is assigned to the assignee hereof, and each of which is expressly incorporated by reference in its entirety herein.

BACKGROUND

The following relates generally to one or more memory systems and more specifically to bit and signal level mapping.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
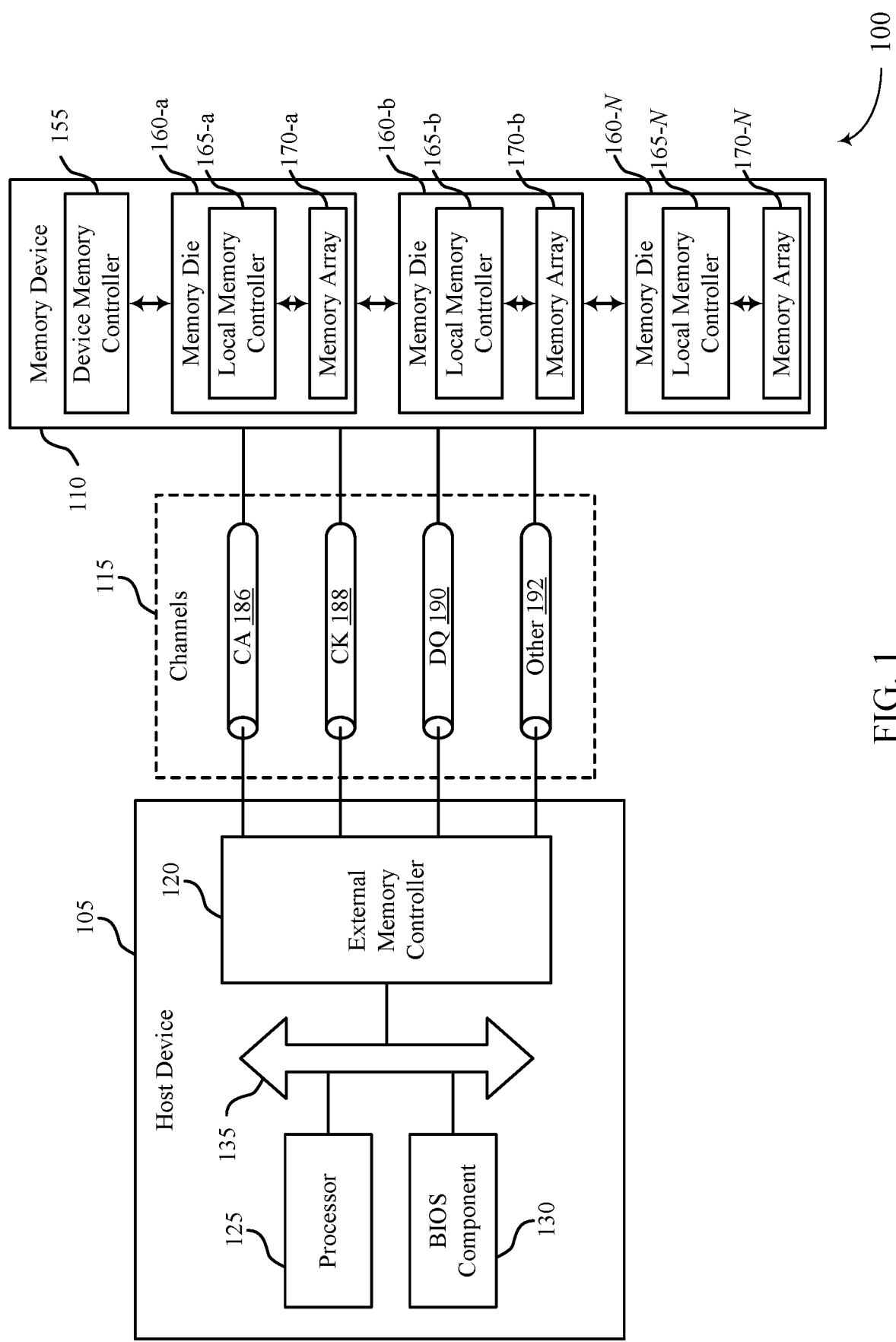
FIG. 1 illustrates an example of a system that supports bit and signal level mapping in accordance with examples as disclosed herein.

A memory device may transmit or receive a signal that includes multiple physical levels (e.g., four (4) physical levels). Such a signal may be referred to as a multi-symbol signal and may be modulated using a modulation scheme (e.g., a pulse amplitude modulation (PAM) scheme) that relates each of the multiple physical levels to a logic level that represents one or more bits of data. The signal may be transmitted or received, for example, via a channel in communication with a host device or in communication with one or more components of the memory device.

In some cases, transitions between a highest physical level and a lowest physical level of a multi-symbol signal (or vice versa) may generate relatively more noise on a channel than transitions between other physical levels of the signal. Such transitions between the highest physical level and the lowest physical (or between the lowest physical level and the highest physical level) may be referred to as maximum transitions, and the noise generated by the maximum transitions may cause interference or errors (or both) with the signal or with one or more other communications, among other problems. For example, the data (e.g., bits) associated with the signal may be processed incorrectly or assigned incorrect values based on the noise resulting from the maximum transitions. Accordingly, maximum transitions and other related disadvantages may be avoided when communicating using a multi-symbol signal based on the described techniques.

Some cyclic redundancy check (CRC) calculations may generate one (1) bit of CRC output per calculation (e.g., one (1) bit per symbol). For example, a half-rate CRC calculation may generate one (1) bit per calculation (e.g., one (1) bit per associated symbol). A CRC output may be transmitted via a multi-symbol signal by converting the output bit(s) from the CRC calculation or process to a physical level of the signal. The conversion, or mapping, process may be configured such that the physical levels of the signal that are mapped avoid a maximum transition for any possible combination of CRC output bits, as one example or possible implementation of the described techniques. For example, a modulation scheme or mapping process may be configured to map different values of CRC output bits to corresponding physical levels, where the resulting physical levels may be separated by one (1) other physical level associated with the signal or the modulation scheme. Additionally, as a more generic example, a modulation scheme or mapping process may be configured to map different values of one or more CRC output bits to one or more corresponding physical levels, where the resulting physical levels may be separated by some quantity of physical levels (e.g., one (1) level, two (2) levels) associated with the signal or the modulation scheme that is/are less than a quantity of physical levels associated with a maximum transition.

Features of the disclosure are initially described in the context of memory systems and dies as described with reference to FIGS. 1 and 2. Features of the disclosure are described in the context of a CRC scheme, a modulation scheme, and a mapping scheme, as described with reference to FIGS. 3A-3C. These and other features of the disclosure are further illustrated by and described with reference to an apparatus diagram and flowcharts that relate to bit and signal level mapping as described with references to FIGS. 4-7.

FIG. 1 illustrates an example of a system 100 that supports bit and signal level mapping in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). The memory system 100 may be referred to as a memory device or memory devices (e.g., and may also be referred to as a memory subsystem).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or a set of pins for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or a set of pins with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dice 160 (e.g., memory chips) to support a desired capacity or a specified capacity for data storage. Each memory die 160 may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dice may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dice 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission media that carry information between the host device 105 and the memory device. Each channel 115 may include one or more signal paths or transmission media (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums (e.g., a CRC), to improve system reliability. An EDC channel may include any quantity of signal paths. The memory device 110 or the host device 105 may perform various operations to support error detection (e.g., detecting errors of communication between the host device 105 and the memory device 110 or detecting errors in access operations with the memory device 110).

For example, signaling between components of the memory device 110, or between the memory device 110 and the host device 105, may include write data, and the memory device 110 may calculate a checksum (e.g., a CRC) or other condensed version of the write data. A checksum of the write data, for example, may be transmitted to the host device 105. The host device 105 may calculate a checksum (e.g., CRC) of the write data, and may compare the calculated value with the received value to detect whether the memory device 110 properly received or wrote the data, or whether various error recovery operations should be performed. The described checksum operations may, in some cases, be performed in reverse fashion (e.g., when the memory device 110 performs a comparison of a calculated checksum with a checksum received from the host device 105). The checksum operations may also be performed for communications between components of the memory device 110 (e.g., between the device memory controller 155 and one or more memory dice 160, or between memory dice 160). The memory device 110 may also generate checksums (e.g., CRCs) for read data transmitted to the host device 105, command/address data received from the host device 105, or combinations thereof.

Signals communicated over the channels 115 described herein may be modulated using one or more different modulation schemes. In some examples, a binary-symbol (or binary-level) modulation scheme may be used to modulate signals communicated between the host device 105 and the memory device 110 or between components of the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), or others.

In some examples, a multi-symbol (or multi-level) modulation scheme may be used to modulate signals communicated between the host device 105 and the memory device 110. In some examples, a multi-symbol (or multi-level) modulation scheme may be used to modulate signals communicated between components of the memory device 110 (e.g., between the device memory controller 155 and one or more memory dice 160, or between memory dice 160). A multi-symbol modulation scheme may be an example of a M-ary modulation scheme where M is greater than or equal to three. Each symbol of a multi-symbol modulation scheme may be operable to represent more than one bit of digital data (e.g., a symbol may represent a logic '00,' a logic '01,' a logic '10,' or a logic '11'). Examples of multi-symbol modulation schemes include, but are not limited to, PAM3, PAM4, PAM8, quadrature amplitude modulation (QAM), quadrature phase shift keying (QPSK), or others. A multi-symbol signal (e.g., a PAM3 signal or a PAM4 signal) may be a signal that is modulated using a modulation scheme that includes at least three levels to encode more than one bit of information. Some multi-symbol signals may have a data eye width greater than or equal to two data eye widths of a binary signal and may drive a same amount of information as the binary signal. Multi-symbol modulation schemes and symbols may alternatively be referred to as non-binary, multi-bit, or higher-order modulation schemes and symbols.

The memory device 110 or host device 105 may use multi-symbol signaling to increase an amount of information transmitted using a given bandwidth of frequency resources. In some cases, a device memory controller 155 or a local memory controller 165 may be configured to select a type of a modulation scheme (e.g., binary-symbol or multi-symbol) applied to a signal based on one or more parameters. Such parameters may include power consumption parameter of the memory device 110, performance of an application being implemented using the memory device 110, other parameters, or a combination thereof.

In a multi-symbol signal (e.g., a signal modulated using a multi-symbol or multi-level modulation scheme), the modulation scheme may include a larger library of symbols used to represent three or more logic states, such as four logic states. For example, if the multi-symbol signal is modulated with a modulation scheme that includes four unique symbols, the multi-symbol signal may be used to represent up to four logic states, '00,' '01,' '10,' and '11.' As a result, multiple bits of data may be included within a single symbol, thereby increasing an amount of data communicated using a given bandwidth. For example, a symbol may include two bits of data, where one bit is a least significant bit and one bit is a most significant bit. In some examples, a burst length of a multi-symbol signal may be a quantity of symbols that corresponds to a quantity of clock signals. For example, a PAM4 graphics signal may have a burst length of eight (8) symbols (e.g., corresponding to two (2) clock cycles), which may correspond to sixteen (16) bits of data.

In some cases, the modulation schemes of the various signals may be amplitude modulation schemes such as PAM4 or NRZ that encode information in the amplitude (or level) of a signal (e.g., a voltage amplitude or a current amplitude). The symbols of the modulation schemes may be referred to as levels (e.g., physical levels), amplitudes, or signal strengths. For example, a first level of a signal may represent '00,' a second level may represent '01,' a third level may represent '11,' and a fourth level may represent '10.' In some cases, a single symbol of the amplitude modulation scheme may be a constant level applied during a single symbol duration or two or more levels applied during a single symbol duration. The functions of features described herein may apply with types of modulation schemes such as phase modulation schemes, phase-shift keying modulation schemes, frequency shift keying modulation schemes, amplitude-shift keying modulation schemes, on-off keying (OOK) modulation schemes, orthogonal frequency-division multiplexing (OFDM) modulation schemes, spread-spectrum modulation schemes, time-based modulation schemes, or a combination thereof. As such, the symbols or levels of the modulation schemes may be related to signal parameters other than amplitude (e.g., phase, time, frequency).

Multi-level signaling may communicate more information given a finite amount of communication resources than binary-level signals. Additionally, use of different multi-level signaling schemes may allow a device to achieve target communication or operation metrics. A multi-level signal with a larger quantity of levels may provide more bandwidth than a multi-level signal with a smaller quantity of levels. But communicating a multi-level signal that has a larger quantity of levels may also consume more power than communication a multi-level signal that has a smaller quantity of levels. Accordingly, a device may select the quantity of levels in a multi-level signal to provide a target bandwidth or stay within a target power consummation level.

In some cases, the features and functions related to communicating multi-symbol signals and binary-symbol signals may be implemented in devices and contexts other than memory storage. For example, the features of functions described herein may be implemented in personal computing devices, laptops, servers, portable communication devices, or a combination thereof.

In some cases, transitions between a highest physical level and a lowest physical level (e.g., or vice versa) of a multi-symbol signal may generate relatively more noise on a channel than transitions between all other physical levels of the signal. Such transitions may be referred to as maximum transitions as described herein, and the noise generated by the transitions may cause interference or errors (or both) with the signal or with one or more other communications, among additional problems. For example, the data (e.g., bits) associated with the signal may be processed incorrectly or assigned incorrect values based on the noise, among other disadvantages. Accordingly, maximum transitions may be avoided when communicating using a multi-symbol signal as described herein.

Some CRC calculations may generate one (1) bit of CRC output per calculation (e.g., one (1) bit per symbol). For example, a half-rate CRC calculation may generate one (1) bit per calculation (e.g., one (1) bit per associated symbol). A CRC output may be transmitted via a multi-symbol signal by converting CRC output bit(s) to a physical level of the signal. The conversion, or mapping, process may be configured such that the physical levels of the signal avoid a maximum transition for any possible combination of CRC output bits. For example, a modulation scheme or mapping process may be configured to map different values of CRC output bits to corresponding physical levels, where the physical levels are separated by one (1) other physical level associated with the signal or the modulation scheme. Additionally, as a more generic example, a modulation scheme or mapping process may be configured to map different values of one or more CRC output bits to one or more corresponding physical levels, where the resulting physical levels may be separated by some quantity of physical levels (e.g., one (1) level, two (2) levels) associated with the signal or the modulation scheme that is/are less than a quantity of physical levels associated with a maximum transition.

Figure 2:
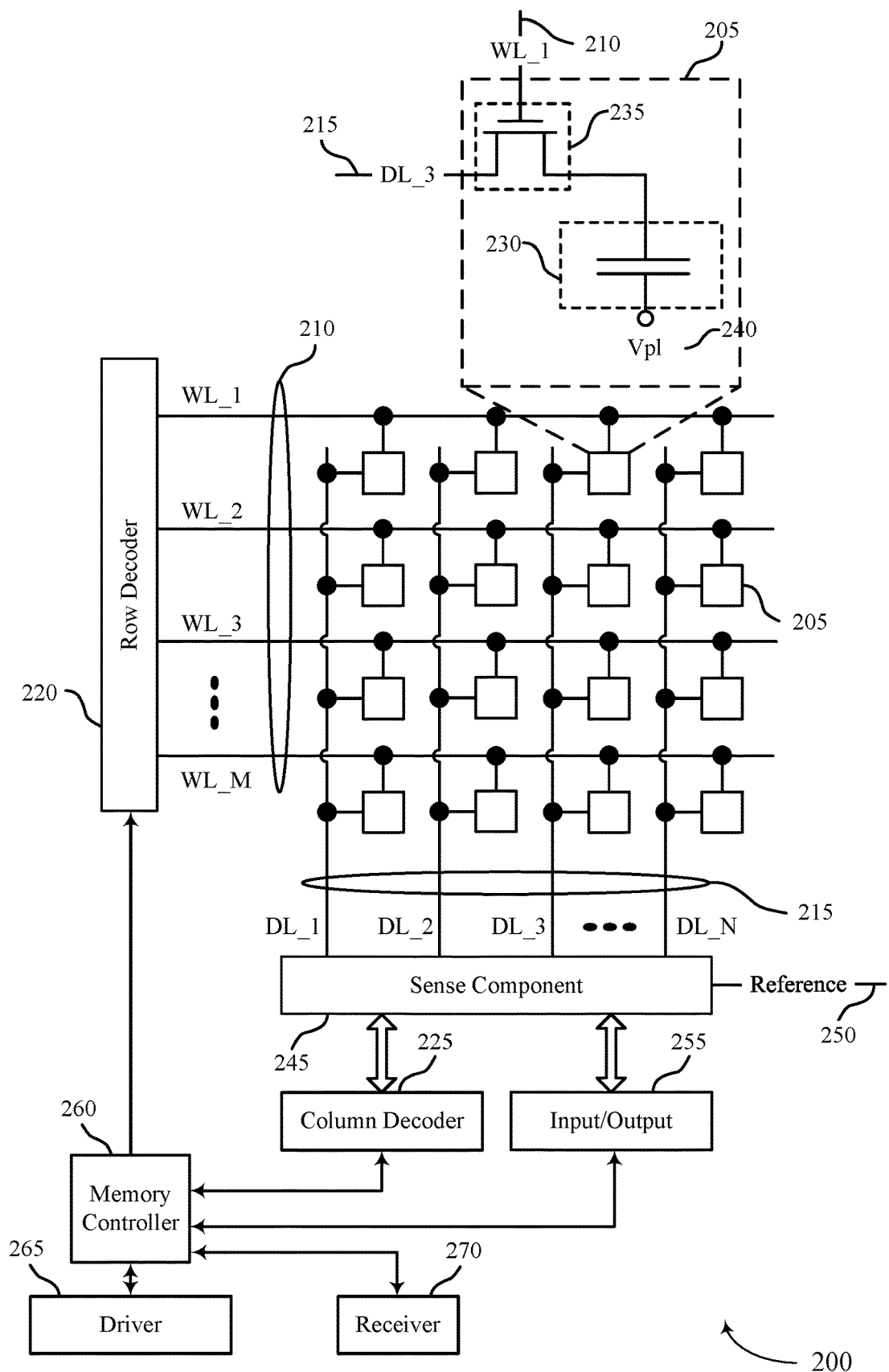
FIG. 2 illustrates an example of a memory die that supports bit and signal level mapping in accordance with examples as disclosed herein.

FIG. 2 illustrates an example of a memory die 200 that supports bit and signal level mapping in accordance with examples as disclosed herein. The memory die 200 may be an example of the memory dice 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one (1) bit of information at a time (e.g., a logic 0 or a logic 1). In some examples, a memory cell 205 (e.g., a multi-level memory cell) may be operable to store more than one (1) bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the memory controller 260 and activate a word line 210 based on the received row address. A column decoder 225 may receive a column address from the memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The memory controller 260 may control the accessing of memory cells 205 through the various components (e.g., row decoder 220, column decoder 225, sense component 245). The memory controller 260 may be an example of the local memory controller 165 or the device memory controller 155 described with reference to FIG. 1. In some examples, one or more of the row decoder 220, column decoder 225, and sense component 245 may be co-located with the memory controller 260. The memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The memory controller 260 may generate row signals and column address signals to activate the target word line 210 and the target digit line 215. The memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the memory controller 260 in response to various access commands (e.g., from a host device 105). The memory controller 260 may be operable to perform other access operations not listed here or other operations related to the operating of the memory die 200 that are not directly related to accessing the memory cells 205.

The memory controller 260 may be coupled with a driver 265 and a receiver 270. One or more components of the memory die 200, such as the driver 265 (e.g., an off-chip driver or transmitter), may be configured to map or transform a logic level associated with data (e.g., bits of data) to a physical level associated with a signal. For example, the driver 265 may be configured to use a modulation scheme having four (4) physical levels and four (4) associated logic levels. The driver 265 may be further configured to, based on the modulation scheme, map a logic level (e.g., associated with data bits for transmission) to a physical level of a signal, and to initiate transmission of the signal. The receiver 270 may be configured to map or transform a physical level associated with a signal to a logic level associated with data (e.g., bits of data). For example, the receiver 270 may be configured to use a modulation scheme having four (4) physical levels and four (4) associated logic levels. The receiver 270 may be further configured to, based on the modulation scheme, receive a signal and map a physical level of the signal to a logic level associated with one or more data bits.

The memory controller 260 may be configured with or may be configured to select a modulation scheme for a multi-symbol signal (e.g., a modulation scheme having three (3) or more levels). In some cases, the memory controller 260 may use the modulation scheme to convert physical levels of a signal to a logic level representing a data symbol (e.g., bits of data) or vice versa. The memory controller 260 may also identify a signal or data (or both) for transmission and may store data received via a signal.

The memory controller 260 may also generate one or more CRC outputs (e.g., bits) associated with a signal based on performing one or more CRC operations. In some examples, a CRC calculation may generate one (1) bit of CRC output per calculation (e.g., one (1) bit per symbol) and may be transmitted via a multi-symbol signal by converting one or more CRC output bits to a physical level of the signal. The conversion, or mapping, process may be configured such that the physical levels of the signal may avoid a transition between a highest physical level and a lowest physical level (e.g., and vice versa) of the signal. For example, a modulation scheme or mapping process may be configured to map different values of CRC output bits to corresponding physical levels, where the physical levels may be separated by one (1) other physical level associated with the signal or the modulation scheme. Additionally, as a more generic example, a modulation scheme or mapping process may be configured to map different values of one or more CRC output bits to one or more corresponding physical levels, where the resulting physical levels may be separated by some quantity (e.g., one or more) of physical levels (e.g., one (1) level, two (2) levels) associated with the signal or the modulation scheme that is/are less than a quantity of physical levels associated with a maximum transition.

Figure 3A:
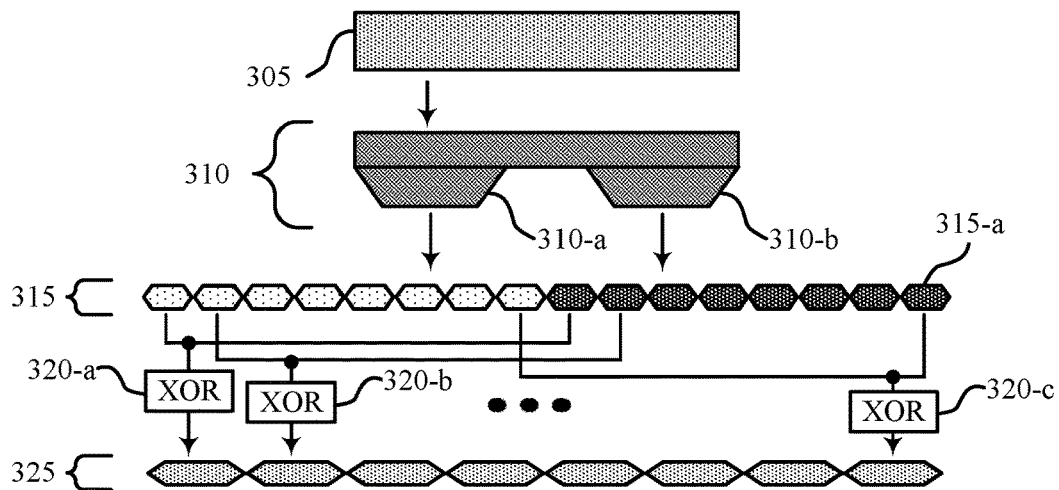
FIGS. 3A, 3B, and 3C illustrate examples of a cyclic redundancy check (CRC) scheme, a modulation scheme, and a mapping scheme, respectively, that support bit and signal level mapping in accordance with examples as disclosed herein.

FIG. 3A illustrates an example of a CRC scheme 301 that supports bit and signal level mapping in accordance with examples as disclosed herein. CRC scheme 301 may represent an example of a method to generate CRC bits associated with a signal (e.g., a multi-symbol signal) modulated with a modulation scheme having three (3) or more levels (e.g., having at least four (4) levels). In some cases, the modulation scheme may include a quantity of physical levels and a same quantity of logic levels that each correspond to one (1) of the physical levels.

In some examples, CRC scheme 301 may represent a method for generating CRC bits using a half-rate calculation (e.g., a half-rate calculation defined by an industry standard such as a Graphics Double Data Rate Type 6 (GDDR6) specification). A half-rate calculation may include calculating, at 310, a quantity of initial CRC bits 315 associated with a transmission burst 305. For example, a first calculation 310-*a* may use information associated with some portion (e.g., a first half) of the burst 305 to generate a first quantity of initial CRC bits 315 that is some portion (e.g., half) the quantity of initial CRC bits 315. A second calculation 310-*b* may use information associated with some portion (e.g., a second half) of the burst 305 to generate a second quantity of initial CRC bits 315 that is some portion (e.g., half) of the quantity of initial CRC bits 315. In some cases, a last CRC bit 315-*a* of the burst 305 may be calculated different (e.g., as defined by an industry standard such as a GDDR6 specification) than other CRC bits 315. After generating the initial CRC bits 315, corresponding pairs of initial CRC bits 315 from the portions (e.g., two (2) halves) of the burst 305 may be, for example, passed through one or more exclusive OR (XOR) operations 320 (e.g., XOR operation 320-*a*, XOR operation 320-*b*, XOR operation 320-*c*) or some other processing. The processing or the XOR operations 320 may result in final CRC bits 325, where a quantity of final CRC bits 325 may be some portion of (e.g., half) the quantity of initial CRC bits 315. Each final CRC bit may have a value of '0' or a value of '1,' and may be referred to as a CRC output value.

In some examples, among others, a burst 305 with a duration of two (2) clock cycles may include eight (8) symbols, and thus each half of the burst 305 may include four (4) symbols. Eight (8) initial CRC bits 315 may be calculated for each half of the burst 305 (e.g., two (2) bits for each symbol), for a total of sixteen (16) initial CRC bits 315. XOR operations 320 may be performed on corresponding CRC bits 315 of each half of the burst 305 to generate final CRC bits 325. For example, a first XOR operation 320-a may be performed on first CRC bits 315 of each half of the burst 305, a second XOR operation 320-b may be performed on second CRC bits 315 of each half of the burst 305, and so on until an eighth XOR operation 320-c may be performed. Each XOR operation 320 may use two (2) initial CRC bits 315 as inputs and may generate one (1) final CRC bit 325 as an output. Thus, eight (8) final CRC bits 325 may be calculated, and the quantity of final CRC bits 325 may be half the quantity of initial CRC bits 315 in some examples.

A half-rate CRC calculation scheme, such as the CRC scheme 301 described herein, among other examples, may generate a quantity of final CRC bits 325 that is equal to a quantity of symbols in a transmission burst 305. For example, if burst 305 includes eight (8) symbols or sixteen (16) bits of data (e.g., with each symbol representing two (2) bits of data), the half-rate CRC calculation scheme may generate eight (8) final CRC bits 325. An EDC channel may be used to transmit the final CRC bits 325, where an EDC transmission or signal may include half an amount of data as the multi-symbol signal used to generate the final CRC bits 325. A mapping scheme, as described herein, may therefore be used to map one bit of CRC data to one symbol of a multi-symbol signal.

Figure 3B:
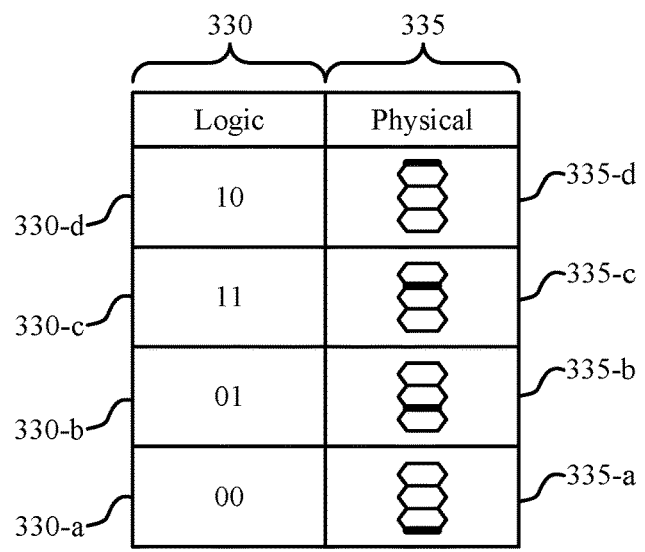

FIG. 3B illustrates an example of a modulation scheme 302 that supports bit and signal level mapping in accordance with examples as disclosed herein. Modulation scheme 302 may represent an example of a modulation scheme having three (3) or more levels (e.g., having four (4) levels) that may be used to modulate a multi-symbol signal. In some cases, modulation scheme 302 may include a quantity of logic levels 330 and associated physical levels 335 (e.g., amplitude, phase, time, frequency levels).

For example, a first logic level 330-a may represent bits '00' and may be associated with a first physical level 335-a of a signal via modulation scheme 302. Similarly, a second logic level 330-b may represent bits '01' and may be associated with a second physical level 335-b of the signal. A third logic level 330-c and fourth logic level 330-d may represent bits '11' and '10,' respectively, and may be respectively associated with a third physical level 335-c and fourth physical level 335-d of the signal. The bits associated with the logic levels 330 may, in some cases, be referred to as a symbol, and when multiple bits are included in a symbol, the symbol may be referred to as a multi-bit symbol.

In some cases, a highest physical level (e.g., physical level 335-d) may be associated with logic bits '11.' In some cases, the highest physical level may be associated with logic bits '10,' instead of logic bits '11,' which may be referred to or performed as part of Gray coding. In some examples, Gray coding may be implemented to avoid changing more than one bit (e.g., a least significant bit or a most significant bit) between consecutive physical levels 335 of a signal, and may decrease an error rate of data transmitted via the signal, among other benefits. A termination level may refer to a final physical level 335 of a signal, which, in some cases, may be physical level 335-d (e.g., high-level termination) or physical level 335-a (e.g., low-level termination).

A device, such as a memory device or a host device, may use modulation scheme 302 to transmit or receive a multi-symbol signal. For example, a driver of a memory device or a host device may, based on modulation scheme 302, convert a logic value of data (e.g., associated with a logic level 330) to a physical level 335 of the signal (e.g., using a stored mapping that may be stored within a memory die (e.g., a memory die 200 described with reference to FIG. 2) or another component such as a stored table or using a mapping that may be received from one or more other devices such as a host device). Similarly, a receiver of a memory device or host device may, based on modulation scheme 302, convert a physical level 335 of the signal to a logic level 330 and an associated logic value of data. In some cases, a controller of the memory device or host device may also use modulation scheme 302 to map physical levels 335 and logic levels 330 (e.g., when receiving or transmitting a signal). A memory device or a host device may use modulation scheme 302 to transmit or receive CRC outputs (e.g., CRC data) via an EDC channel, as described with reference to FIG. 3A.

As described with reference to FIG. 3A, a CRC output may include one (1) bit of information for each symbol of a signal. If a CRC output includes one (1) bit for each symbol of a signal, all CRC outputs may be transmitted and received using two (2) levels (e.g., two (2) physical levels 335 and logic levels 330) of modulation scheme 302. As described herein, maximum transitions between two (2) levels (e.g., between a highest physical level 335 and lowest physical level 335) may generate more noise or interference in the signal. For example, a receiver may experience more interference when adjusting to receive a lowest physical level 335 and highest physical level 335 consecutively. Thus, maximum transitions may be avoided when relating one (1) bit of information to a logic level 330 and a physical level 335 for transmission in a signal, as described with reference to FIG. 3C and otherwise herein.

Figure 3C:
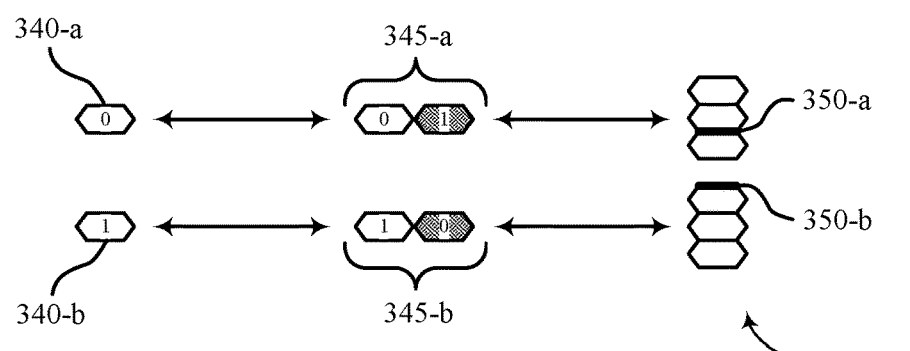

FIG. 3C illustrates an example of a mapping scheme 303 that supports bit and signal level mapping in accordance with examples as disclosed herein. Mapping scheme 303 may be used to map one (1) bit of data to one (1) symbol of a multi-symbol signal, among other examples. For example, as described with reference to FIGS. 3A and 3B, a CRC output 340 may include one (1) bit that is to be mapped to one (1) symbol, and the bit may be mapped to a physical level of the signal (e.g., transmitted via an EDC channel). A CRC output 340 may be a '0' or a '1' and a driver, a controller, any component, or a combination thereof, may map the CRC output 340 to a logic level 345 or to a physical level 350 of a modulation scheme associated with the signal. The driver or a transmitter may then transmit the signal. A receiver may receive a signal (e.g., via an EDC channel) that includes a CRC output 340 mapped to a physical level 350 or a logic level 345 of the signal, and the receiver, a controller, any component, or a combination thereof, may determine a value of the CRC output 340 using the physical level 350 or the logic level 345. The controller may then store the CRC output 340. The following description of mapping scheme 303 provides relations that may be used both to generate a signal for CRC output 340 or to determine CRC output 340 from a received signal.

In a first example, a CRC output 340 may be converted (e.g., by a controller, a driver, a receiver, or a combination thereof) to or from a logic level 345 or a symbol that includes two (2) bits (e.g., a multi-bit symbol). The two (2) bits may include a most significant bit having a same value as the CRC output 340 and a least significant bit having a different (e.g., inverted) output than the CRC output 340. For example, a CRC output 340-*a* may have a value of '0' and a corresponding logic level 345-*a* may have a value of '01,' while a CRC output 340-*b* may have a value of '1' and a corresponding logic level 345-*b* may have a value of '10.' Thus, the value of the CRC output 340 may be indicated by a value of the most significant bit or by an inverse value of the least significant bit.

The logic level 345 may be converted (e.g., by a controller, a driver, a receiver, or a combination thereof) to or from a physical level 350 (e.g., physical level 350-*a*, physical level 350-*b*) of a signal. For example, the logic level 345 may be converted to or from a corresponding physical level 350 using a modulation scheme, as described with reference to FIG. 3B (e.g., using a physical level 350 that is associated with the logic level 345 via the modulation scheme). For example, logic level 345-*a* may be converted to or from a second physical level 350-*a* and logic level 345-*b* may be converted to or from a highest physical level 350-*b* (e.g., using a modulation scheme), where physical levels 350-*a* and 350-*b* may be separated by a third physical level 350 (e.g., a single physical level 350) of the modulation scheme. In some cases, physical level 350-*b* may be a termination level, as described herein with reference to FIG. 3B, and mapping scheme 303 may be based on the termination level (e.g., mapping scheme 303 may be configured to use at least one physical level 350 that is the termination level).

Additionally or alternatively, a CRC output 340-*a* having a value of '0' may be associated with a first logic level 345 having a value of '00,' where both the most significant bit and the least significant bit indicate the CRC output 340-*a*. Similarly, a CRC output 340-*b* having a value of '1' may be associated with a second logic level 345 having a value of '11,' where both the most significant bit and the least significant bit indicate the CRC output 340-*b*. The first logic level 345 (e.g., '00') may be associated with a lowest physical level 350 and the second logic level 345 (e.g., '11') may be associated with a third physical level 350, where the third physical level 350 and the lowest physical level 350 may be separated by the second physical level 350-*a*. In some cases, the lowest physical level 350 may be a termination level, as described herein, and mapping scheme 303 may be based on the termination level (e.g., mapping scheme 303 may be configured to use at least one physical level 350 that is the termination level). The logic levels 345 may be associated with the corresponding physical levels 350 via a modulation scheme, as described herein.

The first example of mapping scheme 303 provides methods for mapping one (1) bit associated with a CRC output 340 to one (1) symbol of a multi-symbol transmission or signal. Further, the first example avoids a maximum transition between physical levels 350 of the signal that correspond to different CRC outputs 340. For example, the physical levels 350 of the different CRC outputs 340 may be separated by one (1) other physical level 350 of a modulation scheme.

In a second example, a CRC output 340 may be converted (e.g., by a controller, a driver, a receiver, or a combination thereof) to or from a physical level 350 of a multi-symbol signal or transmission. The physical level 350 may correspond to a logic level 345 or symbol that includes two (2) bits (e.g., a multi-bit symbol). As described herein, the logic level 345 may include a most significant bit having a same value as the CRC output 340 and a least significant bit having a different value than the CRC output 340, or the logic level 345 may include a most significant bit and a least significant bit that both have a same value as the CRC output 340.

The CRC output 340 may be converted (e.g., by a controller, a driver, a receiver, or a combination thereof) to or from a physical level 350 of the signal. For example, the CRC output 340 may be converted to or from a corresponding physical level 350 using a modulation scheme as described with reference to FIG. 3B (e.g., using a physical level 350 that is associated with the CRC output 340 or associated with the logic level 345 corresponding to the CRC output 340). For example, CRC output 340-*a* (e.g., '0') may be converted to or from a second physical level 350-*a* and CRC output 340-*b* (e.g., '1') may be converted to or from a highest physical level 350-*b* (e.g., using a modulation scheme), where physical levels 350-*a* and 350-*b* may be separated by a third physical level 350 of the modulation scheme. Additionally or alternatively, CRC output 340-*a* (e.g., '0') may be converted to or from a lowest physical level 350 and CRC output 340-*b* (e.g., '1') may be converted to or from a third physical level 350, where the third physical level 350 and the lowest physical level 350 may be separated by the second physical level 350-*a*. In some cases, either the highest physical level 350-*b* or the lowest physical level 350 may be a termination level, as described herein, and mapping scheme 303 may be based on the termination level (e.g., mapping scheme 303 may be configured to use at least one physical level 350 that is the termination level).

The second example of mapping scheme 303 provides methods for mapping one (1) bit associated with a CRC output 340 to one (1) symbol of a multi-symbol transmission or signal. Further, the second example avoids a maximum transition between physical levels 350 of the signal corresponding to different CRC outputs 340. For example, the physical levels 350 of the different CRC outputs 340 may be separated by one (1) other physical level 350 of a modulation scheme.

Figure 4:
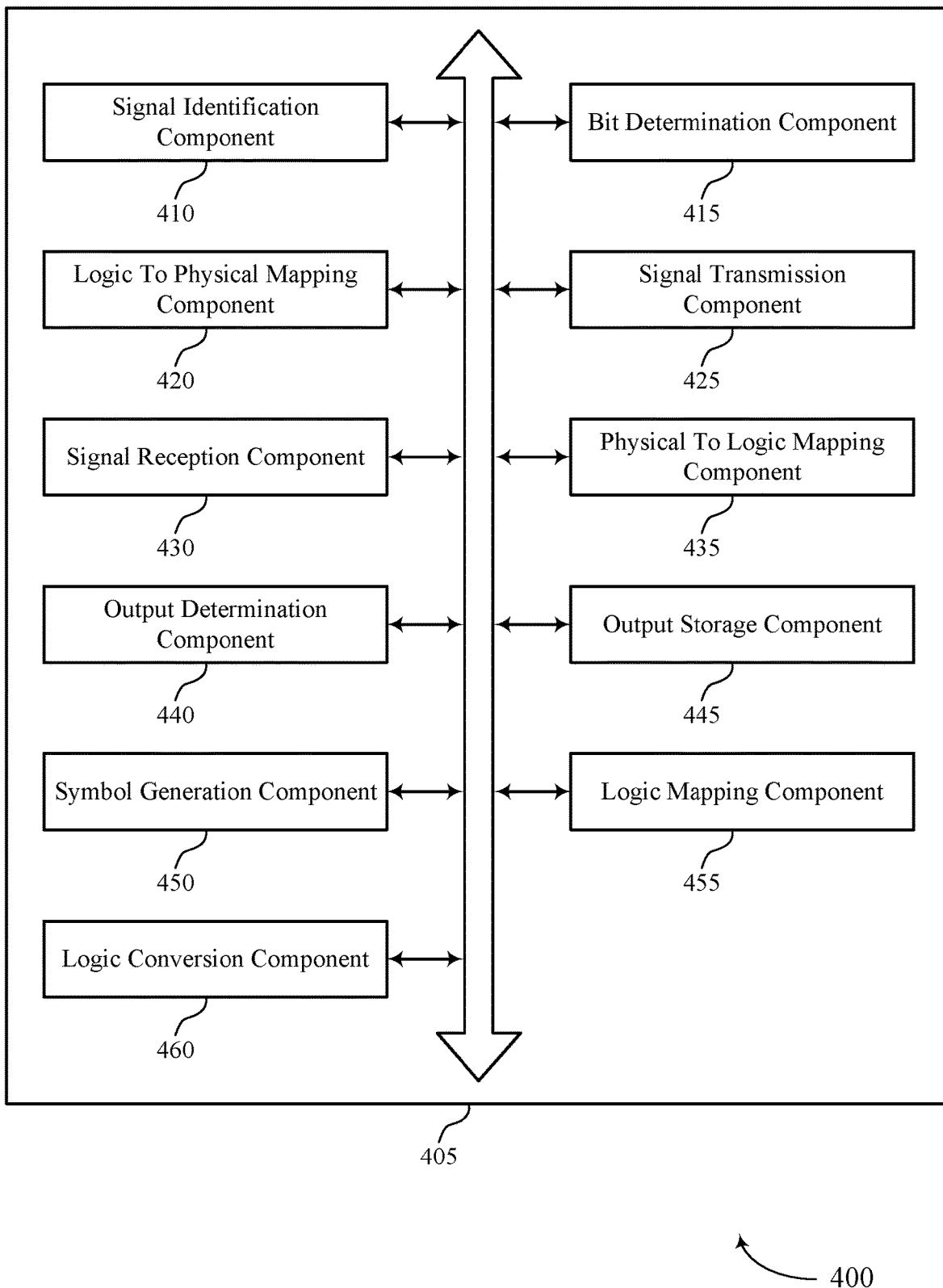
FIG. 4 shows a block diagram of a memory device that supports bit and signal level mapping in accordance with examples as disclosed herein.

FIG. 4 shows a block diagram 400 of a memory device 405 that supports bit and signal level mapping in accordance with examples as disclosed herein. The memory device 405 may be an example of aspects of a memory device as described with reference to FIGS. 1-3. The memory device 405 may include a signal identification component 410, a bit determination component 415, a logic to physical mapping component 420, a signal transmission component 425, a signal reception component 430, a physical to logic mapping component 435, an output determination component 440, an output storage component 445, a symbol generation component 450, a logic mapping component 455, and a logic conversion component 460. Each of these modules may communicate, directly or indirectly, with one another (e.g., via one or more buses).

The signal identification component 410 may identify a signal for transmission, the signal modulated using a modulation scheme that includes at least four physical levels.

The bit determination component 415 may determine a first bit indicating a first output value for a CRC associated with the signal and a second bit indicating a second output value for the CRC associated with the signal. In some examples, the bit determination component 415 may determine a first bit indicating a first output value for a CRC associated with a signal and a second bit indicating a second output value for the CRC associated with the signal, the signal modulated using a modulation scheme that includes at least four logic levels. In some cases, the first bit includes a value of 0 and the second bit includes a value of 1 or the first bit includes a value of 1 and the second bit includes a value of 0. In some cases, the first bit includes a value of 0 and the second bit includes a value of 0 or the first bit includes a value of 1 and the second bit includes a value of 1.

The logic to physical mapping component 420 may map, based on determining the first bit and the second bit, the first bit with a first physical level of the at least four physical levels and the second bit with a second physical level of the at least four physical levels, where the first physical level and the second physical level are separated by a third physical level (e.g., a single physical level) of the at least four physical levels.

In some examples, the logic to physical mapping component 420 may map the first bit or the second bit with a termination level of the at least four physical levels. In some examples, the logic to physical mapping component 420 may map the first bit or the second bit with a highest level of the at least four physical levels. In some examples, the logic to physical mapping component 420 may map the first bit or the second bit with a lowest level of the at least four physical levels. In some examples, the logic to physical mapping component 420 may convert a first logic level corresponding to the first bit to the first physical level.

In some examples, the logic to physical mapping component 420 may convert a second logic level corresponding to the second bit to the second physical level, where mapping the first bit with the first physical level and the second bit with the second physical level is based on converting the first logic level and the second logic level. In some cases, the first physical level is associated with a first multi-bit symbol and the second physical level is associated with a second multi-bit symbol. In some cases, each bit of the first multi-bit symbol has a different value than a corresponding bit of the second multi-bit symbol.

The signal transmission component 425 may transmit the signal based on mapping the first bit with the first physical level and the second bit with the second physical level. In some examples, the signal transmission component 425 may transmit the signal based on mapping the first data symbol with the first logic level and the second data symbol with the second logic level.

The signal reception component 430 may receive a signal modulated using a modulation scheme that includes at least four physical levels.

The physical to logic mapping component 435 may map, based on receiving the signal, a first physical level of the at least four physical levels with a first bit value and a second physical level of the at least four physical levels with a second bit value, where the first physical level and the second physical level are separated by a single third physical level of the at least four physical levels.

In some examples, the physical to logic mapping component 435 may map a termination level of the at least four physical levels with the first bit value or the second bit value. In some examples, the physical to logic mapping component 435 may map a highest level of the at least four physical levels with the first bit value or the second bit value. In some examples, the physical to logic mapping component 435 may map a lowest level of the at least four physical levels with the first bit value or the second bit value. In some examples, the physical to logic mapping component 435 may convert the first physical level to a first logic level that corresponds to the first bit value.

In some examples, the physical to logic mapping component 435 may convert the second physical level to a second logic level that corresponds to the second bit value, where mapping the first physical level with the first bit value and the second physical level with the second bit value is based on converting the first physical level and the second physical level. In some cases, the first physical level is associated with a first multi-bit symbol and the second physical level is associated with a second multi-bit symbol. In some cases, each bit of the first multi-bit symbol has a different value than a corresponding bit of the second multi-bit symbol.

The output determination component 440 may determine, based on mapping the first physical level with the first bit value and the second physical level with the second bit value, a first bit indicating a first output value for a CRC associated with the signal and a second bit indicating a second output value for the CRC associated with the signal. In some cases, the first bit includes a value of 0 and the second bit includes a value of 1 or the first bit includes a value of 1 and the second bit includes a value of 0. In some cases, the first bit includes a value of 0 and the second bit includes a value of 0 or the first bit includes a value of 1 and the second bit includes a value of 1.

The output storage component 445 may store, based on determining the first bit and the second bit, the first bit indicating the first output value and the second bit indicating the second output value for the CRC.

The symbol generation component 450 may generate, based on determining the first bit and the second bit, a first data symbol and a second data symbol that each include multiple bits, where the generating may include: setting a value of a most significant bit of the first data symbol and the second data symbol to a respective value of the first bit and a respective value of the second bit, and setting a value of a least significant bit of the first data symbol and the second data symbol to a different value than the respective value of the first bit and the respective value of the second bit. In some cases, each bit of the first data symbol has a different value than a corresponding bit of the second data symbol.

The logic mapping component 455 may map the first data symbol with a first logic level of the at least four logic levels and the second data symbol with a second logic level of the at least four logic levels, where the first logic level and the second logic level are separated by a single third logic level of the at least four logic levels. In some examples, the logic mapping component 455 may map the first data symbol or the second data symbol with a termination level of the at least four logic levels. In some examples, the logic mapping component 455 may map the first bit or the second bit with a highest level of the at least four logic levels.

The logic conversion component 460 may convert the first logic level to a first physical level of the at least four physical levels. In some examples, the logic conversion component 460 may convert the second logic level to a second physical level of the at least four physical levels, where the first physical level and the second physical level are separated by a single third physical level of the at least four physical levels, and where mapping the first data symbol with the first logic level and the second data symbol with the second logic level is based on converting the first logic level and the second logic level.

Figure 5:
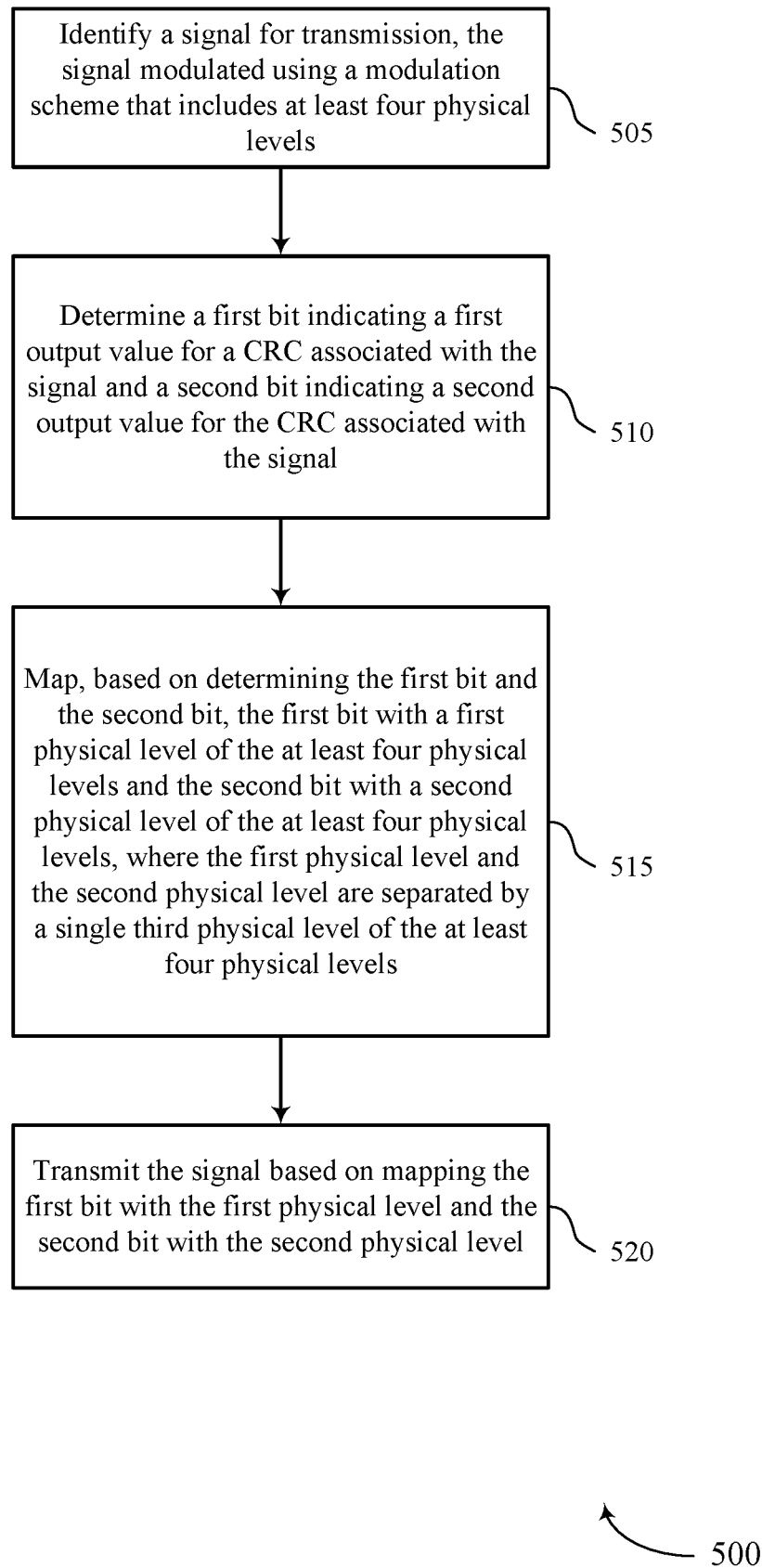
FIGS. 5 through 7 show flowcharts illustrating a method or methods for bit and signal level mapping in accordance with examples as disclosed herein.

FIG. 5 shows a flowchart illustrating a method or methods 500 that supports bit and signal level mapping in accordance with examples as disclosed herein. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may identify a signal for transmission, the signal modulated using a modulation scheme that includes at least four physical levels. The operations of 505 may be performed according to the methods described with reference to FIGS. 3A-3C. In some examples, aspects of the operations of 505 may be performed by a signal identification component as described with reference to FIG. 4.

At 510, the memory device may determine a first bit indicating a first output value for a CRC associated with the signal and a second bit indicating a second output value for the CRC associated with the signal. The operations of 510 may be performed according to the methods described with reference to FIGS. 3A-3C. In some examples, aspects of the operations of 510 may be performed by a bit determination component as described with reference to FIG. 4.

At 515, the memory device may map, based on determining the first bit and the second bit, the first bit with a first physical level of the at least four physical levels and the second bit with a second physical level of the at least four physical levels, where the first physical level and the second physical level are separated by a third physical level (e.g., a single physical level) of the at least four physical levels. The operations of 515 may be performed according to the methods described with reference to FIGS. 3A-3C. In some examples, aspects of the operations of 515 may be performed by a logic to physical mapping component as described with reference to FIG. 4.

At 520, the memory device may transmit the signal based on mapping the first bit with the first physical level and the second bit with the second physical level. The operations of 520 may be performed according to the methods described with reference to FIGS. 3A-3C. In some examples, aspects of the operations of 520 may be performed by a signal transmission component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for identifying a signal for transmission, the signal modulated using a modulation scheme that includes at least four physical levels, determining a first bit indicating a first output value for a CRC associated with the signal and a second bit indicating a second output value for the CRC associated with the signal, mapping, based on determining the first bit and the second bit, the first bit with a first physical level of the at least four physical levels and the second bit with a second physical level of the at least four physical levels, where the first physical level and the second physical level are separated by a third physical level (e.g., a single physical level) of the at least four physical levels, and transmitting the signal based on mapping the first bit with the first physical level and the second bit with the second physical level.

In some examples of the method 500 and the apparatus described herein, the mapping may include operations, features, means, or instructions for mapping the first bit or the second bit with a termination level of the at least four physical levels.

In some examples of the method 500 and the apparatus described herein, the mapping may include operations, features, means, or instructions for mapping the first bit or the second bit with a highest level of the at least four physical levels.

In some examples of the method 500 and the apparatus described herein, the mapping may include operations, features, means, or instructions for mapping the first bit or the second bit with a lowest level of the at least four physical levels.

Some examples of the method 500 and the apparatus described herein may further include operations, features, means, or instructions for converting a first logic level corresponding to the first bit to the first physical level, and converting a second logic level corresponding to the second bit to the second physical level, where mapping the first bit with the first physical level and the second bit with the second physical level may be based on converting the first logic level and the second logic level.

In some examples of the method 500 and the apparatus described herein, the first physical level may be associated with a first multi-bit symbol and the second physical level may be associated with a second multi-bit symbol.

In some examples of the method 500 and the apparatus described herein, each bit of the first multi-bit symbol may have a different value than a corresponding bit of the second multi-bit symbol.

In some examples of the method 500 and the apparatus described herein, the first bit includes a value of 0 and the second bit includes a value of 1 or the first bit includes a value of 1 and the second bit includes a value of 0.

In some examples of the method 500 and the apparatus described herein, the first bit includes a value of 0 and the second bit includes a value of 0 or the first bit includes a value of 1 and the second bit includes a value of 1.

Figure 6:
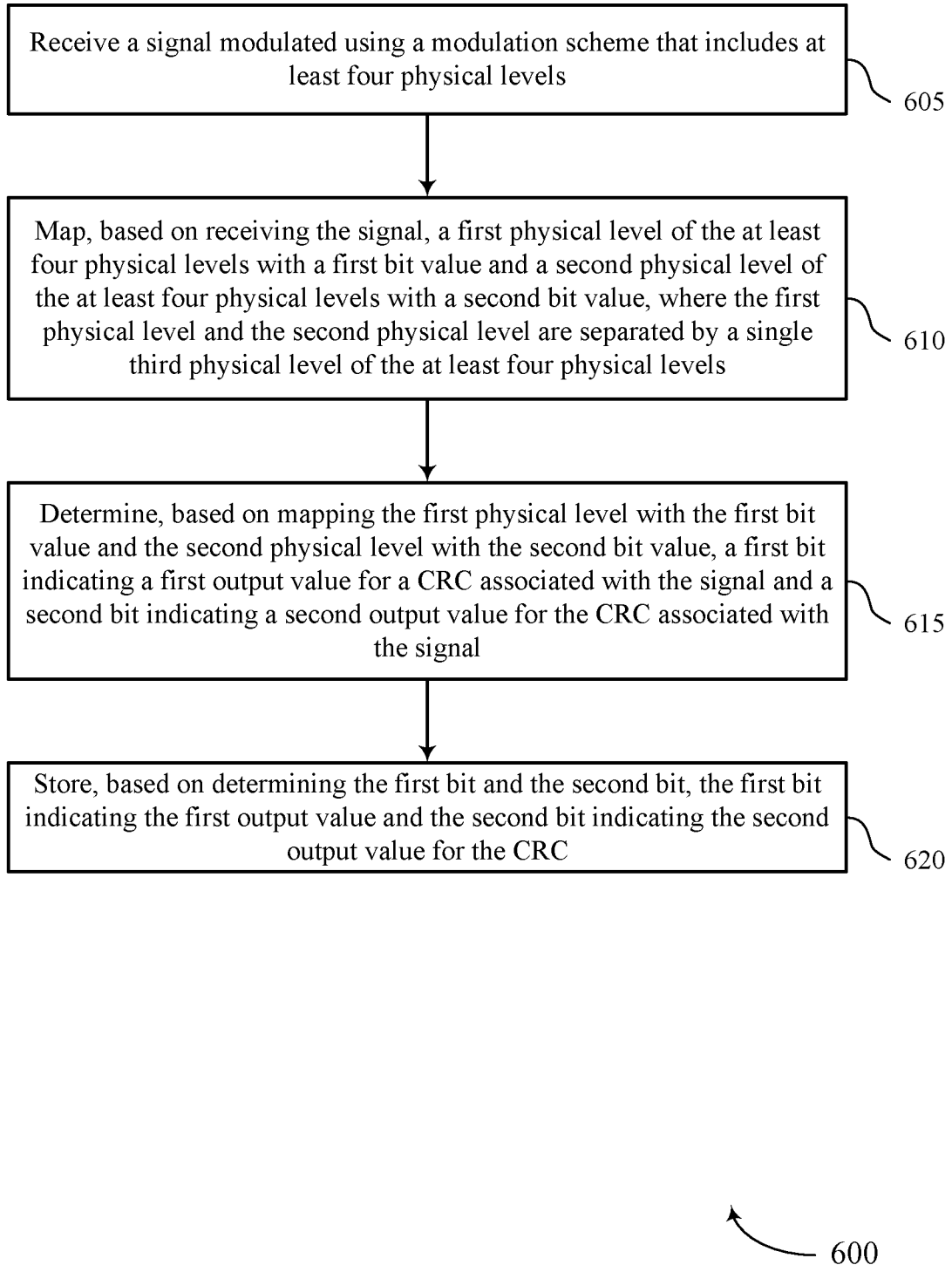

FIG. 6 shows a flowchart illustrating a method or methods 600 that supports bit and signal level mapping in accordance with examples as disclosed herein. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may receive a signal modulated using a modulation scheme that includes at least four physical levels. The operations of 605 may be performed according to the methods described with reference to FIGS. 3A-3C. In some examples, aspects of the operations of 605 may be performed by a signal reception component as described with reference to FIG. 4.

At 610, the memory device may map, based on receiving the signal, a first physical level of the at least four physical levels with a first bit value and a second physical level of the at least four physical levels with a second bit value, where the first physical level and the second physical level are separated by a third physical level (e.g., a single physical level) of the at least four physical levels. The operations of 610 may be performed according to the methods described with reference to FIGS. 3A-3C. In some examples, aspects of the operations of 610 may be performed by a physical to logic mapping component as described with reference to FIG. 4.

At 615, the memory device may determine, based on mapping the first physical level with the first bit value and the second physical level with the second bit value, a first bit indicating a first output value for a CRC associated with the signal and a second bit indicating a second output value for the CRC associated with the signal. The operations of 615 may be performed according to the methods described with reference to FIGS. 3A-3C. In some examples, aspects of the operations of 615 may be performed by an output determination component as described with reference to FIG. 4.

At 620, the memory device may store, based on determining the first bit and the second bit, the first bit indicating the first output value and the second bit indicating the second output value for the CRC. The operations of 620 may be performed according to the methods described with reference to FIGS. 3A-3C. In some examples, aspects of the operations of 620 may be performed by an output storage component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving a signal modulated using a modulation scheme that includes at least four physical levels, mapping, based on receiving the signal, a first physical level of the at least four physical levels with a first bit value and a second physical level of the at least four physical levels with a second bit value, where the first physical level and the second physical level are separated by a third physical level (e.g., a single physical level) of the at least four physical levels, determining, based on mapping the first physical level with the first bit value and the second physical level with the second bit value, a first bit indicating a first output value for a CRC associated with the signal and a second bit indicating a second output value for the CRC associated with the signal, and storing, based on determining the first bit and the second bit, the first bit indicating the first output value and the second bit indicating the second output value for the CRC.

In some examples of the method 600 and the apparatus described herein, the mapping may include operations, features, means, or instructions for mapping a termination level of the at least four physical levels with the first bit value or the second bit value.

In some examples of the method 600 and the apparatus described herein, the mapping may include operations, features, means, or instructions for mapping a highest level of the at least four physical levels with the first bit value or the second bit value.

In some examples of the method 600 and the apparatus described herein, the mapping may include operations, features, means, or instructions for mapping a lowest level of the at least four physical levels with the first bit value or the second bit value.

Some examples of the method 600 and the apparatus described herein may further include operations, features, means, or instructions for converting the first physical level to a first logic level that corresponds to the first bit value, and converting the second physical level to a second logic level that corresponds to the second bit value, where mapping the first physical level with the first bit value and the second physical level with the second bit value may be based on converting the first physical level and the second physical level.

In some examples of the method 600 and the apparatus described herein, the first physical level may be associated with a first multi-bit symbol and the second physical level may be associated with a second multi-bit symbol.

In some examples of the method 600 and the apparatus described herein, each bit of the first multi-bit symbol may have a different value than a corresponding bit of the second multi-bit symbol.

In some examples of the method 600 and the apparatus described herein, the first bit includes a value of 0 and the second bit includes a value of 1 or the first bit includes a value of 1 and the second bit includes a value of 0.

In some examples of the method 600 and the apparatus described herein, the first bit includes a value of 0 and the second bit includes a value of 0 or the first bit includes a value of 1 and the second bit includes a value of 1.

Figure 7:
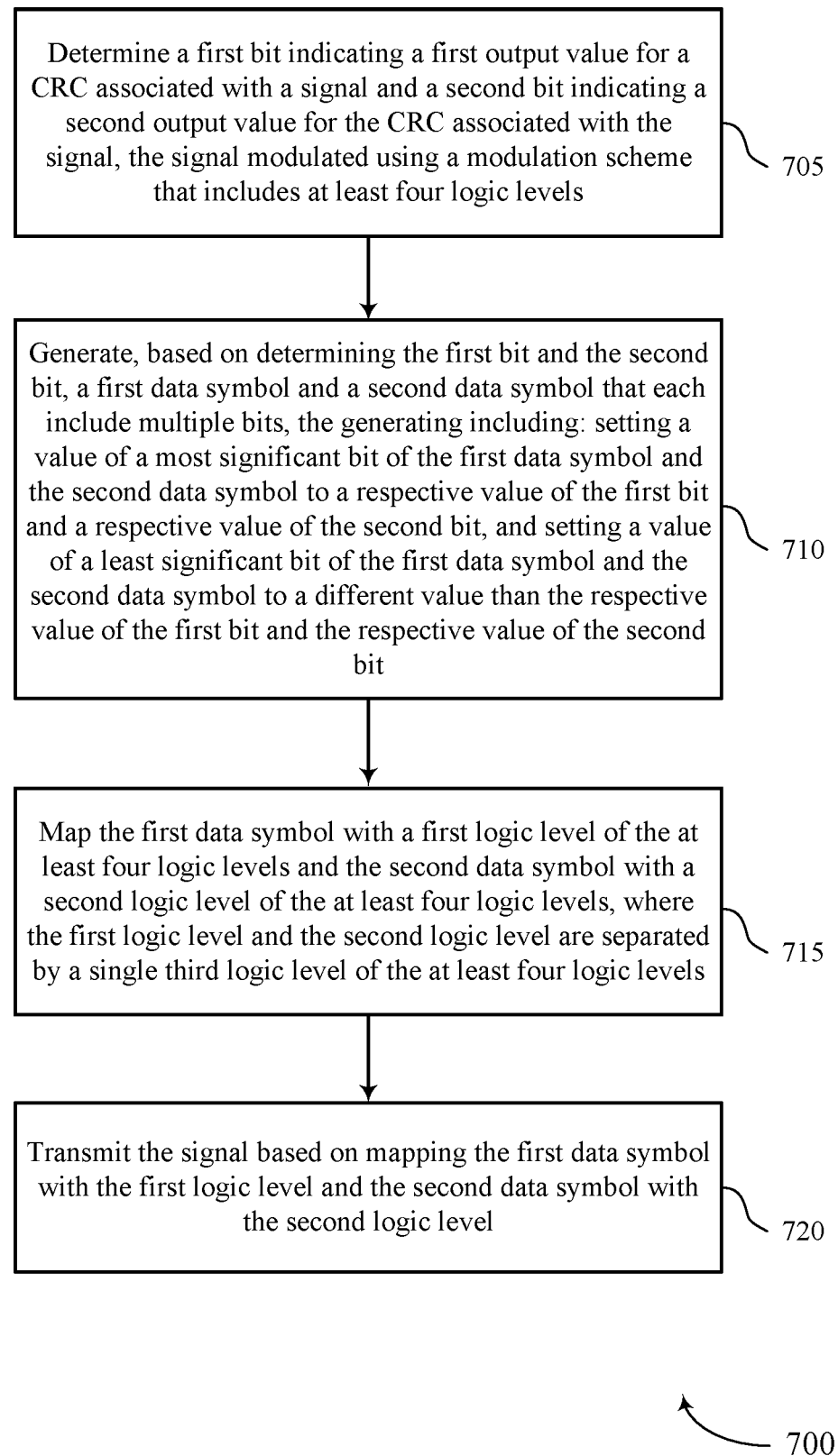

FIG. 7 shows a flowchart illustrating a method or methods 700 that supports bit and signal level mapping in accordance with examples as disclosed herein. The operations of method 700 may be implemented by a memory device or its components as described herein. For example, the operations of method 700 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 705, the memory device may determine a first bit indicating a first output value for a CRC associated with a signal and a second bit indicating a second output value for the CRC associated with the signal, the signal modulated using a modulation scheme that includes at least four logic levels. The operations of 705 may be performed according to the methods described with reference to FIGS. 3A-3C. In some examples, aspects of the operations of 705 may be performed by a bit determination component as described with reference to FIG. 4.

At 710, the memory device may generate, based on determining the first bit and the second bit, a first data symbol and a second data symbol that each include multiple bits, the generating including: setting a value of a most significant bit of the first data symbol and the second data symbol to a respective value of the first bit and a respective value of the second bit, and setting a value of a least significant bit of the first data symbol and the second data symbol to a different value than the respective value of the first bit and the respective value of the second bit. The operations of 710 may be performed according to the methods described with reference to FIGS. 3A-3C. In some examples, aspects of the operations of 710 may be performed by a symbol generation component as described with reference to FIG. 4.

At 715, the memory device may map the first data symbol with a first logic level of the at least four logic levels and the second data symbol with a second logic level of the at least four logic levels, where the first logic level and the second logic level are separated by a third logic level (e.g., a single logic level) of the at least four logic levels. The operations of 715 may be performed according to the methods described with reference to FIGS. 3A-3C. In some examples, aspects of the operations of 715 may be performed by a logic mapping component as described with reference to FIG. 4.

At 720, the memory device may transmit the signal based on mapping the first data symbol with the first logic level and the second data symbol with the second logic level. The operations of 720 may be performed according to the methods described with reference to FIGS. 3A-3C. In some examples, aspects of the operations of 720 may be performed by a signal transmission component as described with reference to FIG. 4.

In some examples, an apparatus as described herein may perform a method or methods, such as the method 700. The apparatus may include features, means, or instructions (e.g., a non-transitory computer-readable medium storing instructions executable by a processor) for determining a first bit indicating a first output value for a CRC associated with a signal and a second bit indicating a second output value for the CRC associated with the signal, the signal modulated using a modulation scheme that includes at least four logic levels, generating, based on determining the first bit and the second bit, a first data symbol and a second data symbol that each include multiple bits, the generating including, mapping the first data symbol with a first logic level of the at least four logic levels and the second data symbol with a second logic level of the at least four logic levels, where the first logic level and the second logic level are separated by a third logic level (e.g., a single logic level) of the at least four logic levels, and transmitting the signal based on mapping the first data symbol with the first logic level and the second data symbol with the second logic level.

In some examples of the method 700 and the apparatus described herein, the mapping may include operations, features, means, or instructions for mapping the first data symbol or the second data symbol with a termination level of the at least four logic levels.

In some examples of the method 700 and the apparatus described herein, the mapping may include operations, features, means, or instructions for mapping the first bit or the second bit with a highest level of the at least four logic levels.

Some examples of the method 700 and the apparatus described herein may further include operations, features, means, or instructions for converting the first logic level to a first physical level of the at least four physical levels, and converting the second logic level to a second physical level of the at least four physical levels, where the first physical level and the second physical level may be separated by a third physical level (e.g., a single physical level) of the at least four physical levels, and where mapping the first data symbol with the first logic level and the second data symbol with the second logic level may be based on converting the first logic level and the second logic level.

In some examples of the method 700 and the apparatus described herein, each bit of the first data symbol may have a different value than a corresponding bit of the second data symbol.

It should be noted that the methods described herein describe possible implementations, and that the operations and the steps may be rearranged or otherwise modified and that other implementations are possible. Further, portions from two or more of the methods may be combined.

An apparatus is described. The apparatus may include a controller configured to identify a signal for transmission, the signal modulated using a modulation scheme that includes at least four physical levels, and determine a first bit indicating a first output value for a CRC associated with the signal and a second bit indicating a second output value for the CRC associated with the signal. The apparatus may include a driver coupled with the controller and configured to map, based on the first bit and the second bit, the first bit with a first physical level of the at least four physical levels and the second bit with a second physical level of the at least four physical levels, where the first physical level and the second physical level are separated by a third physical level (e.g., a single physical level) of the at least four physical levels, and a transmitter coupled with the driver and configured to transmit the signal based on mapping the first bit with the first physical level and the second bit with the second physical level.

Some examples may further include mapping the first bit or the second bit with a termination level of the at least four physical levels. Some examples may further include mapping the first bit or the second bit with a highest level of the at least four physical levels. Some examples may further include mapping the first bit or the second bit with a lowest level of the at least four physical levels.

Some examples may further include converting a first logic level corresponding to the first bit to the first physical level, and converting a second logic level corresponding to the second bit to the second physical level, where mapping the first bit with the first physical level and the second bit with the second physical level may be based on converting the first logic level and the second logic level. In some examples, the first physical level may be associated with a first multi-bit symbol and the second physical level may be associated with a second multi-bit symbol. In some examples, each bit of the first multi-bit symbol may have a different value than a corresponding bit of the second multi-bit symbol.

An apparatus is described. The apparatus may include a receiver configured to receive a signal modulated using a modulation scheme that includes at least four physical levels. The apparatus may include a controller coupled with the receiver and configured to: map, based on receiving the signal, a first physical level of the at least four physical levels with a first bit value and a second physical level of the at least four physical levels with a second bit value, where the first physical level and the second physical level are separated by a single third physical level of the at least four physical levels, determine, based on mapping the first physical level with the first bit value and the second physical level with the second bit value, a first bit indicating a first output value for a CRC associated with the signal and a second bit indicating a second output value for the CRC associated with the signal, and store, based on determining the first bit and the second bit, the first bit indicating the first output value and the second bit indicating the second output value for the CRC.

Some examples may further include mapping a termination level of the at least four physical levels with the first bit value or the second bit value. Some examples may further include mapping a highest level of the at least four physical levels with the first bit value or the second bit value. Some examples may further include mapping a lowest level of the at least four physical levels with the first bit value or the second bit value.

Some examples may further include converting the first physical level to a first logic level that corresponds to the first bit value, and converting the second physical level to a second logic level that corresponds to the second bit value. In some examples, the first physical level may be associated with a first multi-bit symbol and the second physical level may be associated with a second multi-bit symbol. In some examples, each bit of the first multi-bit symbol may have a different value than a corresponding bit of the second multi-bit symbol.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a controller configured to:
   determine, from a signal modulated using a modulation scheme that includes at least four physical levels, a first bit associated with a first portion of the signal and a second bit associated with a second portion of the signal based at least in part on a half-rate calculation;
   map, based at least in part on determining the first bit and the second bit, the first bit with a first physical level of the at least four physical levels and the second bit with a second physical level of the at least four physical levels; and
   transmit the signal based at least in part on mapping the first bit and the second bit.

2. The apparatus of claim 1, wherein the controller is further configured to cause the apparatus to:
   map the first bit or the second bit with a termination level of the at least four physical levels, wherein each of the at least four physical levels is associated with one or more logic bits based at least in part on a gray coding scheme.

3. The apparatus of claim 1, wherein the controller is further configured to cause the apparatus to:
   map the first bit or the second bit with a highest level of the at least four physical levels.

4. The apparatus of claim 1, wherein the controller is further configured to cause the apparatus to:
   map the first bit or the second bit with a lowest level of the at least four physical levels.

5. The apparatus of claim 1, wherein the controller is further configured to cause the apparatus to:
   convert a first logic level corresponding to the first bit to the first physical level; and
   convert a second logic level corresponding to the second bit to the second physical level, wherein mapping the first bit with the first physical level and the second bit with the second physical level is based at least in part on converting the first logic level and the second logic level.

6. The apparatus of claim 1, wherein the first physical level is associated with a first multi-bit symbol and the second physical level is associated with a second multi-bit symbol.

7. The apparatus of claim 6, wherein each bit of the first multi-bit symbol has a different value than a corresponding bit of the second multi-bit symbol.

8. The apparatus of claim 1, wherein the first bit comprises a value of 0 and the second bit comprises a value of 1 or the first bit comprises a value of 1 and the second bit comprises a value of 0.

9. The apparatus of claim 1, wherein the first bit comprises a value of 0 and the second bit comprises a value of 0 or the first bit comprises a value of 1 and the second bit comprises a value of 1.

10. An apparatus, comprising:
    a controller configured to:
    identify a signal for transmission, the signal modulated using a modulation scheme that includes at least four physical levels and the signal comprising a quantity of symbols, each symbol representing two bits of data;
    performing a first calculation on a first portion of the signal to generate a first quantity of cyclic redundancy check (CRC) bits and performing a second calculation on a second portion of the signal to generate a second quantity of CRC bits;
    combine an initial bit from the first quantity of CRC bits with an initial bit from the second quantity of CRC bits to generate an output bit; and
    transmit the signal and the output bit based at least in part on generating the output bit.

11. The apparatus of claim 10, wherein the controller is further configured to cause the apparatus to:
    map the output bit to a physical level of the at least four physical levels of the signal.

12. The apparatus of claim 10, wherein the first calculation and the second calculation are associated with a half-rate calculation.

13. The apparatus of claim 10, wherein the output bit is associated with a quantity of output bits generated from combining CRC bits from the first quantity of CRC bits and initial bits from the second quantity of CRC bits.

14. The apparatus of claim 13, wherein the quantity of output bits equals the quantity of symbols in the signal.

15. The apparatus of claim 10, wherein the combining is an XOR operation.

16. An apparatus, comprising:
    a controller configured to:
        determine a first bit associated with a signal and a second bit associated with the signal, the signal modulated using a modulation scheme that includes at least four logic levels; and
        generate, based at least in part on determining the first bit and the second bit, a first data symbol and a second data symbol that each comprise multiple bits, the generating comprising:
            setting a value of a most significant bit of the first data symbol and the second data symbol to a respective value of the first bit and a respective value of the second bit;
            setting a value of a least significant bit of the first data symbol and the second data symbol to a different value than the respective value of the first bit and the respective value of the second bit;
            mapping the first data symbol with a first logic level of the at least four logic levels and the second data symbol with a second logic level of the at least four logic levels; and
        transmit the signal based at least in part on mapping the first data symbol and the second data symbol.

17. The apparatus of claim 16, wherein the controller is further configured to cause the apparatus to:
    map the first data symbol or the second data symbol with a termination level of the at least four logic levels.

18. The apparatus of claim 16, wherein the controller is further configured to cause the apparatus to:
    map the first bit or the second bit with a highest level of the at least four logic levels.

19. The apparatus of claim 16, wherein the controller is further configured to cause the apparatus to:
    convert the first logic level to a first physical level of at least four physical levels; and
    convert the second logic level to a second physical level of the at least four physical levels, wherein mapping the first data symbol with the first logic level and the second data symbol with the second logic level is based at least in part on converting the first logic level and the second logic level.

20. The apparatus of claim 16, wherein the controller is further configured to cause the apparatus to:
    map each bit of the first data symbol to a different value than a corresponding bit of the second data symbol.

* * * * *